United States Patent
Urushizaki

(10) Patent No.: US 11,565,449 B2
(45) Date of Patent: Jan. 31, 2023

(54) CONTROL PANEL FOR INJECTION MOLDING MACHINE

(71) Applicant: FANUC CORPORATION, Minamitsuru-gun (JP)

(72) Inventor: Tetsuharu Urushizaki, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/071,297

(22) Filed: Oct. 15, 2020

(65) Prior Publication Data
US 2021/0114270 A1 Apr. 22, 2021

(30) Foreign Application Priority Data
Oct. 18, 2019 (JP) .............................. JP2019-191251

(51) Int. Cl.
*B29C 45/17* (2006.01)

(52) U.S. Cl.
CPC .. B29C 45/1774 (2013.01); *B29C 2045/1784* (2013.01)

(58) Field of Classification Search
CPC ........................ B29C 45/1774; B29C 45/1784
USPC ...................................................... 425/169
See application file for complete search history.

(56) References Cited

U.S. PATENT DOCUMENTS

| | | | | | |
|---|---|---|---|---|---|
| 3,088,561 | A | * | 5/1963 | Ruzicka | E04C 3/29 52/703 |
| 4,063,683 | A | * | 12/1977 | Jones | B60R 11/0205 439/298 |
| 4,976,598 | A | * | 12/1990 | Hehl | B29C 45/1774 425/161 |
| 5,060,260 | A | * | 10/1991 | O'Connell | B60R 11/0241 379/426 |
| 2003/0015883 | A1 | * | 1/2003 | Boys | B60R 9/00 296/37.1 |

(Continued)

FOREIGN PATENT DOCUMENTS

| | | | | | |
|---|---|---|---|---|---|
| JP | 05278071 | A | * | 10/1993 | ............. B29C 45/17 |
| JP | 2000185335 | A | * | 7/2000 | ............. B29C 45/17 |

(Continued)

OTHER PUBLICATIONS

Machine Translation JP2000246772A (Year: 2000).*
Machine translation JP2000185335A (Year: 2000).*
Machine translation JPH05278071A (Year: 1993).*

*Primary Examiner* — Jacob T Minskey
*Assistant Examiner* — Wayne K. Swier
(74) *Attorney, Agent, or Firm* — McGinn I.P. Law Group, PLLC.

(57) ABSTRACT

A control panel for an injection molding machine is equipped with a module, a mounting member that supports the module and has a width wider than that of the module in a lateral direction of the module, and a plurality of vibration absorbing devices that support the mounting member between the mounting member and an installation surface, and which elastically absorb vibrations transmitted from the installation surface to the module. The plurality of vibration absorbing devices are disposed symmetrically about a center of gravity line defined by a straight line lying parallel to a longitudinal direction of the module and which passes through the center of gravity of the module.

9 Claims, 8 Drawing Sheets

(56) References Cited

U.S. PATENT DOCUMENTS

2014/0072666 A1* 3/2014 Urushizaki ......... B29C 45/1774
425/162

FOREIGN PATENT DOCUMENTS

| JP | 2000246772 A | * | 9/2000 |
| JP | 2014-051047 A | | 3/2014 |

* cited by examiner

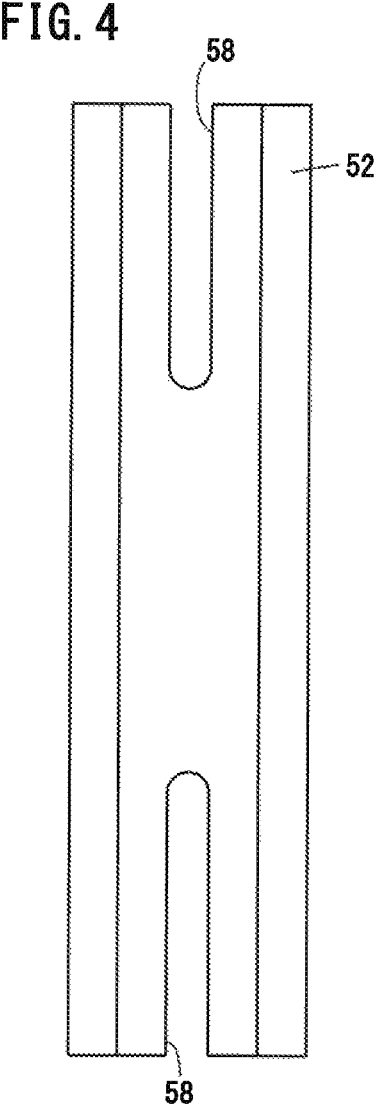

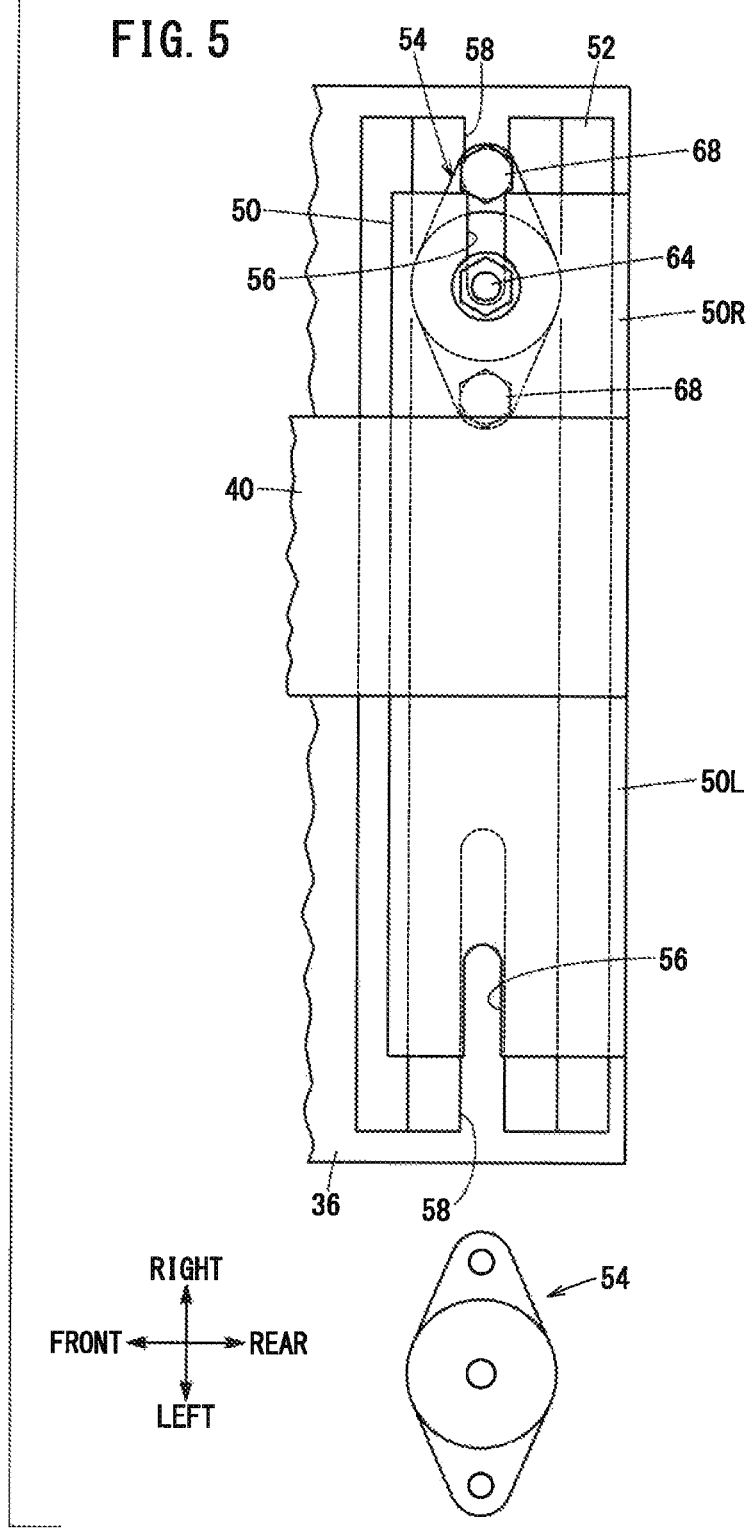

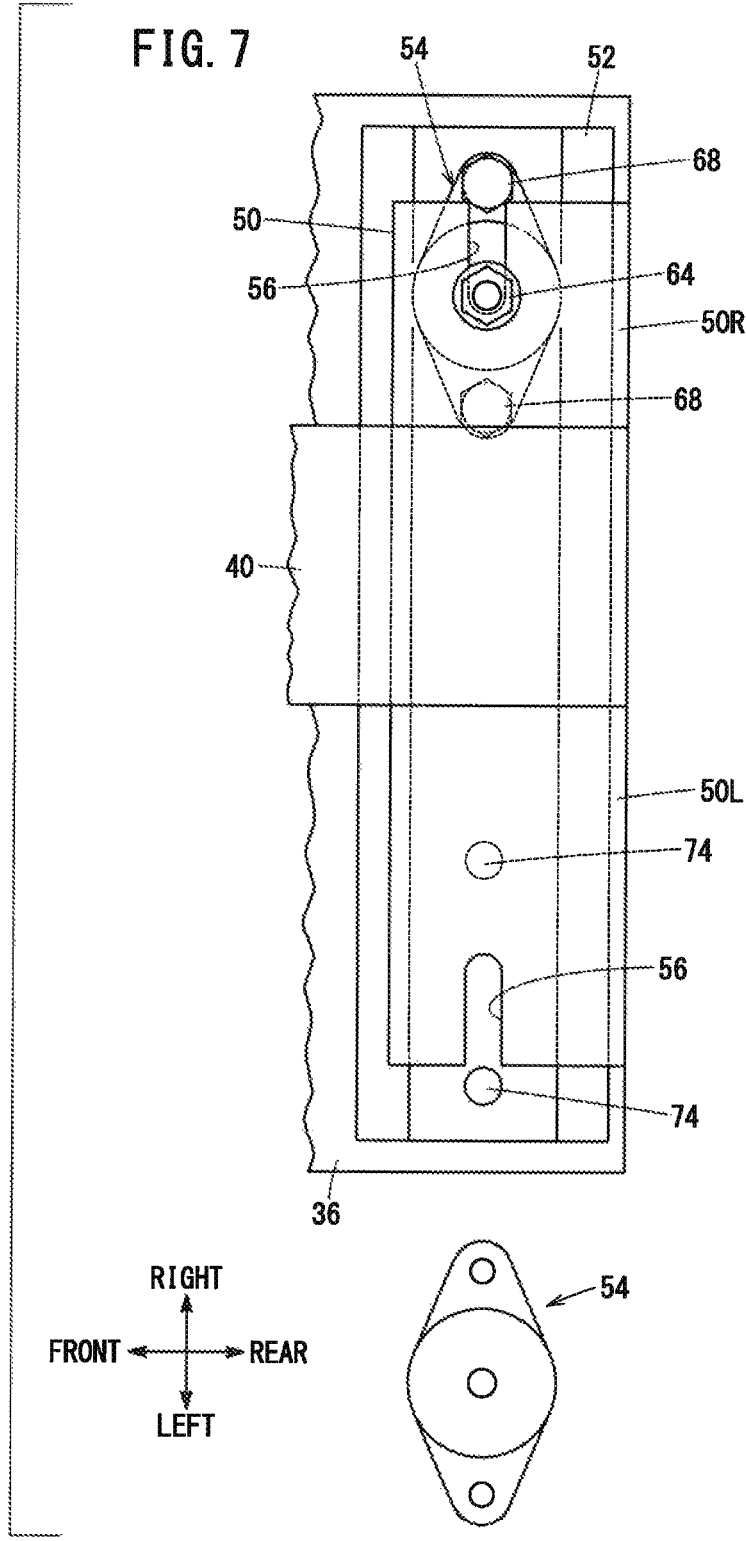

CONTROL PANEL FOR INJECTION MOLDING MACHINE

CROSS-REFERENCE TO RELATED APPLICATION

This application is based upon and claims the benefit of priority from Japanese Patent Application No. 2019-191251 filed on Oct. 18, 2019, the contents of which are incorporated herein by reference.

BACKGROUND OF THE INVENTION

Field of the Invention

The present invention relates to a control panel for an injection molding machine.

Description of the Related Art

In Japanese Laid-Open Patent Publication No. 2014-051047, a technique is disclosed in relation to an injection molding machine having a configuration in which a control panel is accommodated on a machine base, and for dampening vibrations transmitted to a box-shaped member of the control panel. According to the disclosure, the control panel includes a plurality of elastic vibration absorbing devices, and a box-shaped member that is supported on the plurality of vibration absorbing devices.

SUMMARY OF THE INVENTION

Within the disclosed control panel, a plurality of electronic components are mounted on an outer surface of the box-shaped member. Hereinafter, the box-shaped member and the plurality of electronic components that are mounted on the box-shaped member will be collectively referred to as a "module". The vibration absorbing devices also function as support devices for supporting the module.

In this instance, when loads that are applied to each of the plurality of vibration absorbing devices supporting the module differ from each other, the amounts by which the respective devices are compressed also differ. In this case, the module will disadvantageously become inclined with respect to the installation surface. Further, in this case, it becomes difficult for the plurality of vibration absorbing devices to achieve an expected vibration damping effect.

Thus, the present invention has the object of providing a control panel for an injection molding machine in which vibrations transmitted from the installation surface to the module are suitably reduced, and which suitably prevents the module from becoming inclined with respect to the installation surface.

According to one aspect of the present invention, a control panel for an injection molding machine includes a module having a plurality of electronic components, a mounting member configured to support the module, and having a width wider than that of the module in a lateral direction of the module, and a plurality of vibration absorbing devices configured to support the mounting member between the mounting member and an installation surface, and to elastically absorb vibrations transmitted from the installation surface to the module, wherein the plurality of vibration absorbing devices are disposed symmetrically about a center of gravity line defined by a straight line lying parallel to a longitudinal direction of the module and which According to another aspect of the present invention, a control panel for an injection molding machine includes a module having a plurality of electronic components, a mounting member configured to support the module, and having a width wider than that of the module in a lateral direction of the module, and a plurality of vibration absorbing devices configured to support the mounting member between the mounting member and an installation surface, and to elastically absorb vibrations transmitted from the installation surface to the module, wherein the plurality of vibration absorbing devices are disposed so as to interpose therebetween a center of gravity line defined by a straight line lying parallel to a longitudinal direction of the module and which passes through a center of gravity of the module, and a modulus of elasticity of each of the plurality of vibration absorbing devices differs depending on a distance thereof from the center of gravity line.

According to the present invention, the control panel for the injection molding machine is provided in which vibrations transmitted from the installation surface to the module are suitably reduced, and which suitably prevents the module from becoming inclined with respect to the installation surface.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a top view of a flat plate according to the embodiment;

FIG. 5 is a partially enlarged view of FIG. 3;

FIG. 7 is a diagram for the purpose of describing a first modification; and

DESCRIPTION OF THE PREFERRED EMBODIMENTS

A preferred embodiment of a control panel for an injection molding machine according to the present invention will be presented and described in detail below with reference to the accompanying drawings. It should be noted that each of the directions discussed below conform to the arrows shown in the respective drawings.

EMBODIMENTS

Figure 1:
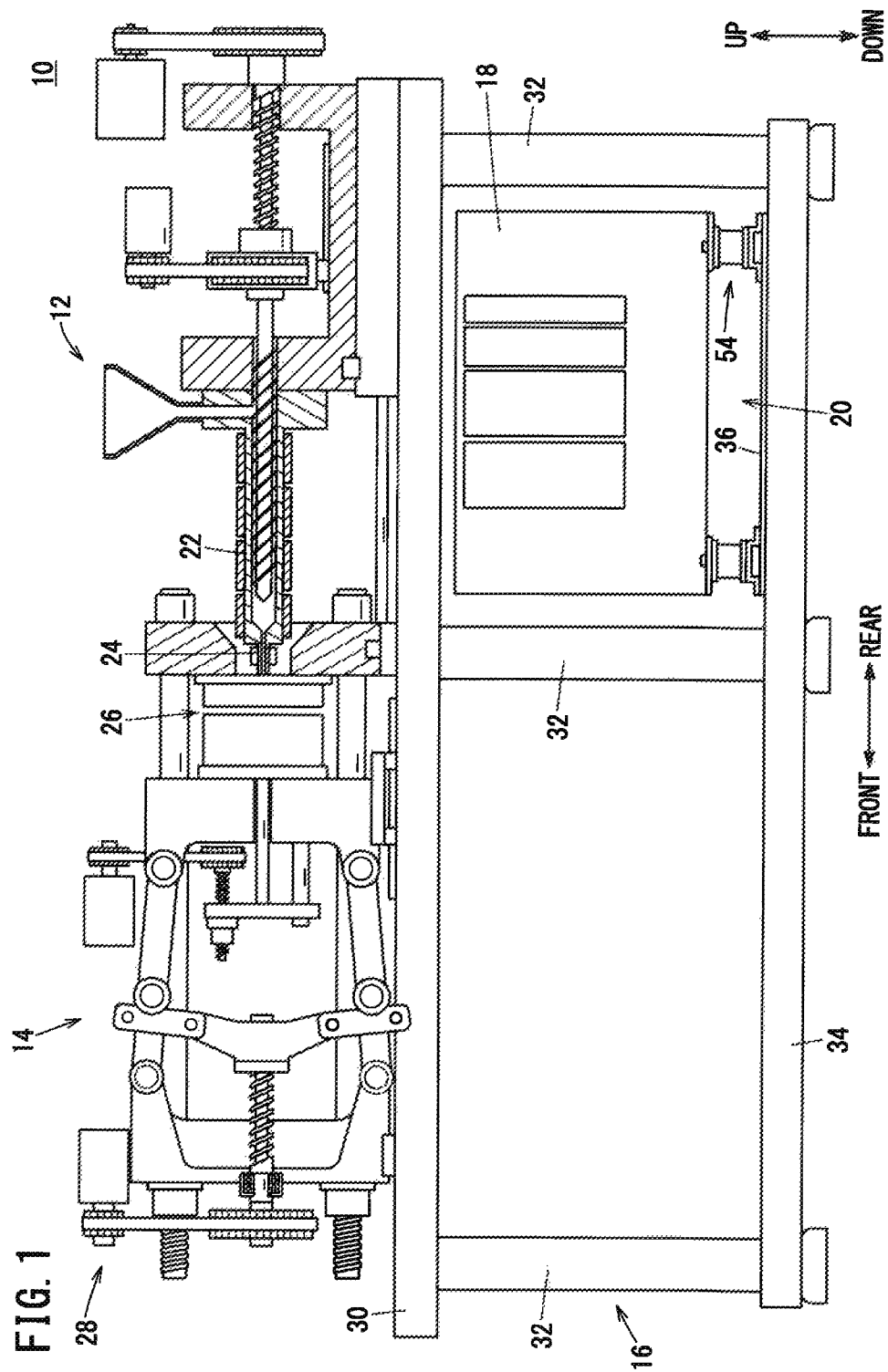
FIG. 1 is a schematic cross-sectional view of an injection molding machine according to an embodiment of the present invention.

FIG. 1 is a schematic cross-sectional view of the injection molding machine 10 according to an embodiment of the present invention.

The injection molding machine 10 is equipped with an injection device 12, a mold clamping device 14, a machine base 16, and a control panel (a control panel for the injection molding machine 10) 18. The injection device 12 and the mold clamping device 14 are supported by the machine base 16 and face toward each other in a longitudinal (front-rear) direction. The machine base 16, in addition to supporting the injection device 12 and the mold clamping device 14, also includes an accommodation space 20, as shown in FIG. 1. The control panel 18 is accommodated in the accommodation space 20.

Among the above-described members, in the present embodiment, the injection device 12 and the mold clamping device 14 may be configured based on a known technique. Accordingly, hereinafter, explanations concerning such members will be kept to a minimum.

The injection device 12 comprises a cylinder 22 and a nozzle 24. The cylinder 22 is a tubular member. A screw is disposed in the interior of the cylinder 22. Further, a molding material is introduced into the interior of the cylinder 22. The molding material, for example, is a resin or a metal. The introduced molding material is stirred (agitated) by rotation of the screw while being heated, to thereby be plasticized. The nozzle 24 is a member provided at an end of the cylinder 22 on a side in the frontward direction (on the side of the mold clamping device 14), and includes an injection port. The plasticized molding material is pushed out through the nozzle 24. Such an operation is also referred to as injection. The injection device 12 undergoes vibration when the molding material is being plasticized and during injection. The form in which the injection device 12 is configured in which the nozzle 24 and the screw are provided in a single cylinder 22 is also referred to as an in-line type, however, the injection device 12 in which vibrations are generated is not necessarily limited to an in-line type.

The mold clamping device 14 includes a mold 26 that is capable of being opened and closed, and an opening/closing mechanism 28 that opens and closes the mold 26. The molding material is injected from the nozzle 24 into the closed mold 26. The injected molding material undergoes solidification inside the mold 26 to thereby become a molded product. The molded product is taken out by opening the mold 26. Upon opening and closing of the mold 26, the opening/closing mechanism 28 (mold clamping device 14) undergoes vibration. Although the mold clamping device 14, an example of which is shown in FIG. 1, is also referred to as a toggle type, the mold clamping device 14 in which vibrations are generated is not limited to a toggle type.

The machine base 16 is equipped with an upper frame 30, a plurality of support columns 32, a lower frame 34, and a floor plate (installation surface) 36. The upper frame 30 is a member that extends in the front-rear direction, and supports from below at least one of the injection device 12 and the mold clamping device 14. The support columns 32 are members that extend in the vertical direction (up-down direction), and support the upper frame 30 from below. The plurality of support columns 32 may be provided as needed. The lower frame 34 is a member that extends in the front-rear direction, and supports the support columns 32 from below. The floor plate 36 is a plate-shaped member which is attached to the lower frame 34, and is positioned below the upper frame 30. The accommodation space 20 in which the control panel 18 is accommodated is formed on the floor plate 36.

Figure 2:
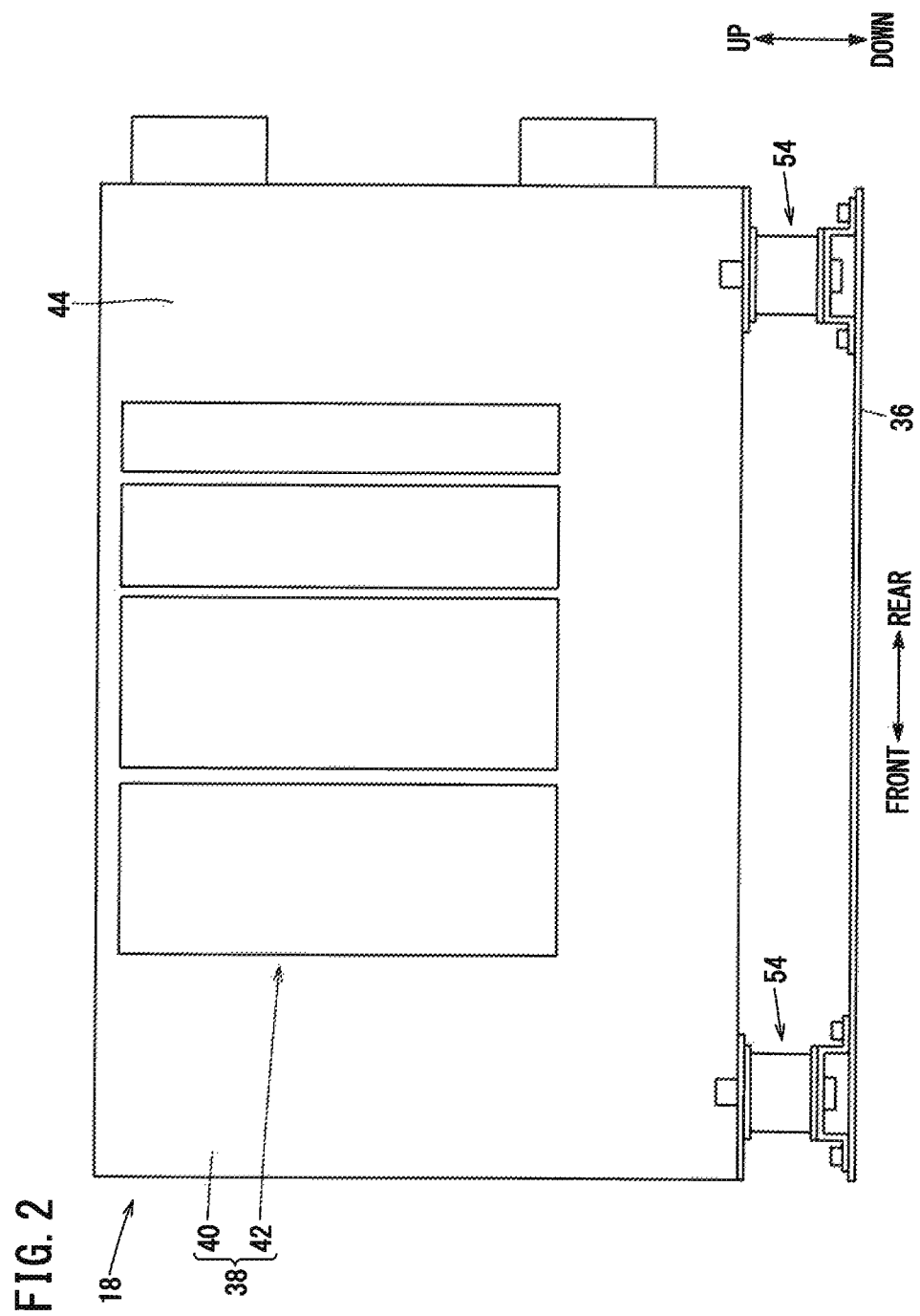
FIG. 2 is a side view of a control panel according to the embodiment.
Figure 3:
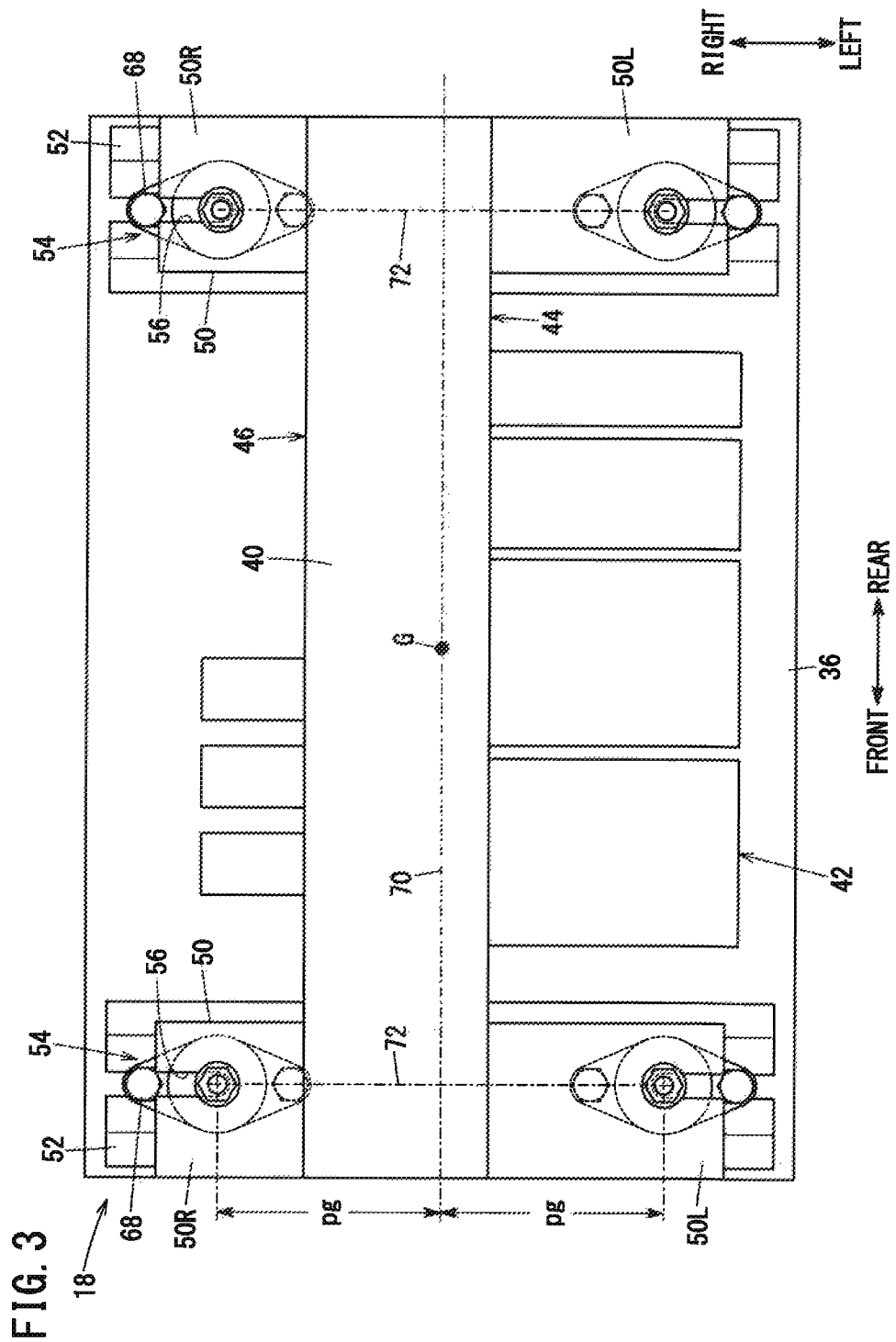
FIG. 3 is a top view of the control panel according to the embodiment.

FIG. 2 is a side view of the control panel 18 according to the embodiment. FIG. 3 is a top view of the control panel 18 according to the embodiment. It should be noted that FIG. 2 shows the control panel as viewed from the leftward direction of FIG. 3.

The control panel 18 is equipped with a module 38. The module 38 is an electronic component group including a duct 40, and a plurality of electronic components 42 mounted on the duct 40. The duct 40 is also referred to as a box-shaped member, and as the name implies, the duct 40 has a shape in the form of a box. According to the present embodiment, as shown in FIG. 3, the longitudinal direction of the module 38 from a viewpoint as seen from above (in a plan view of the installation surface 36) coincides with the longitudinal direction (front-rear direction) of the duct 40. Similarly, the lateral direction of the module 38 coincides with the lateral direction (left-right direction) of the duct 40.

According to the present embodiment, the plurality of electronic components 42 are mounted on a left side surface 44 and a right side surface 46 among the outer surfaces of the duct 40. The number, the type, and the arrangement of the plurality of electronic components 42 are not particularly limited. For example, the number of electronic components 42 that are mounted on the left side surface 44, and the number of electronic components 42 that are mounted on the right side surface 46 may differ from each other.

The control panel 18 further comprises mounting members 50, flat plates (adjustment members) 52, and vibration absorbing devices 54. As will be described below, the control panel 18 of the present embodiment which is equipped with such members is capable of suitably reducing the vibrations transmitted to the module 38. Further, it is possible to suitably prevent the module 38 from becoming inclined with respect to the floor plate (the installation surface) 36.

The mounting members 50 serve as members that support the module 38 from below. Each of the mounting members 50 is of a substantially rectangular shape, and the longitudinal direction thereof when viewed from above is oriented in the left-right direction. The material of the mounting members 50 is not particularly limited, insofar as it is a material that is capable of imparting a strength that does not undergo bending when the module 38 is supported. According to the present embodiment, it is assumed that the material of the mounting members 50 is a material containing metal.

The number of the mounting members 50 is not particularly limited, but according to the present embodiment, is "2". The two mounting members 50 are fixed respectively to both ends of a lower portion of the duct 40 in the front-rear direction. Consequently, the load of the module 38 is suitably distributed to the two mounting members 50. The means for fixing the mounting members 50 to the duct 40 is not particularly limited, but according to the present embodiment, fastening is performed by way of non-illustrated bolts.

Each of the mounting members 50 includes a left end portion (left end) 50L positioned on a left side of the module 38, and a right end portion (right end) 50R positioned on a right side of the duct 40. First notches (first cutout portions) 56 are provided respectively in the left end portion 50L and the right end portion 50R of the mounting members 50. The direction in which the first notches 56 extend is parallel to the lateral direction (left-right direction) of the module 38.

FIG. 4 is a top view of one of the flat plates 52 according to the embodiment. FIG. 5 is a partially enlarged view of FIG. 3. Moreover, in FIG. 5, although only one from among the two mounting members 50 in the present embodiment is shown, the description that follows can similarly be applied to the other mounting member 50.

The flat plates 52 are plate-shaped members arranged downwardly of the mounting members 50. According to the present embodiment, the flat plates 52 are metal plates (sheet metal) in the same manner as the mounting members 50. However, the material that makes up the flat plates 52 is not limited to a metal, and may be a material that differs from the material of the mounting members 50. The flat plates 52 are fixed to the floor plate 36. In such a state, the flat surfaces of the flat plates 52 and the flat surface of the floor plate 36 are parallel to each other. The means for fixing the flat plates 52 to the floor plate 36 is not particularly limited, but according to the present embodiment, the flat plates 52 are fastened thereto by way of bolts.

In the flat plates 52, second notches (second cutout portions) 58 are provided respectively below the first notches 56 on the side of the left end portion 50L, and below the first notches 56 on the side of the right end portion 50R. The second notches 58 extend in the same direction (the left-right direction) as the direction in which the first notches 56 positioned thereabove extend. Moreover, the second notches 58 may be elongated holes that extend in the same direction as the direction in which the first notches 56 extend.

Figure 6A:
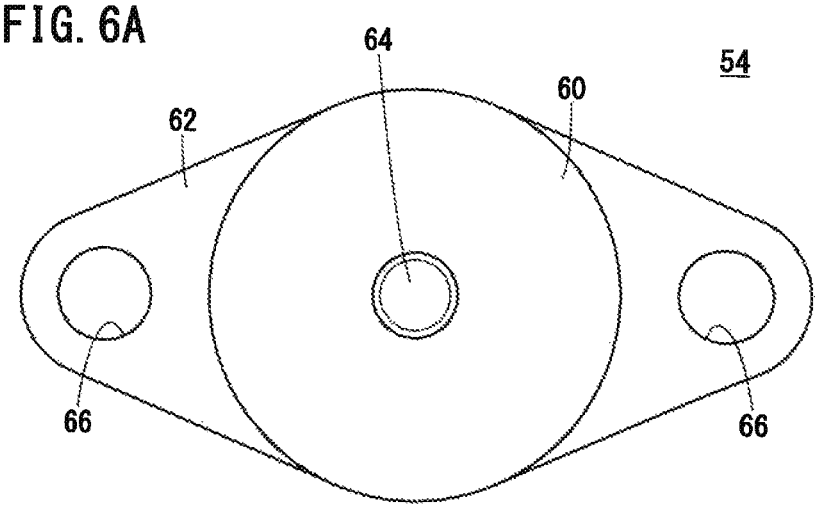
FIG. 6A is a top view of a vibration absorbing device according to the embodiment.
Figure 6B:
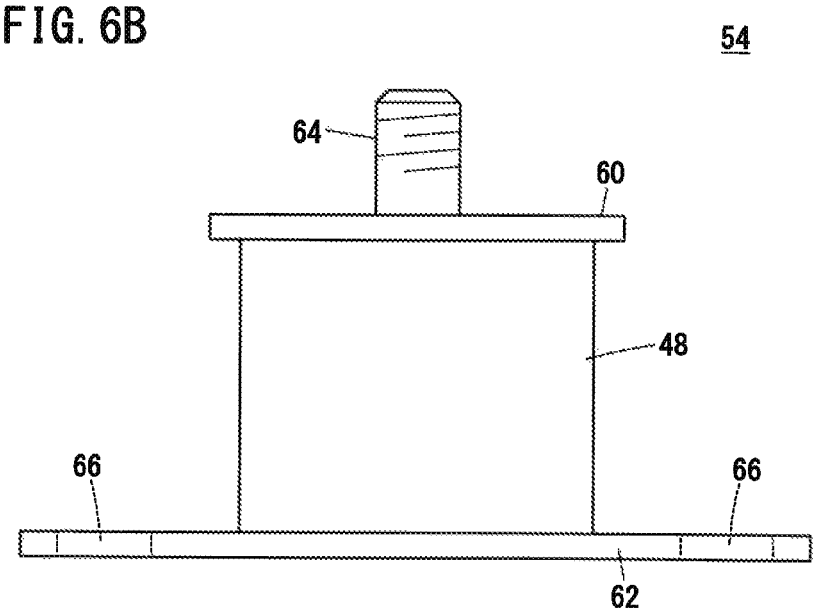
FIG. 6B is a side view of the vibration absorbing device.

FIG. 6A is a top view of one of the vibration absorbing devices 54 according to the embodiment. FIG. 6B is a side view of the vibration absorbing device 54.

The vibration absorbing devices 54 serve to support the mounting members 50 between the mounting members 50 and the flat plates 52. The mounting members 50 which are supported by the vibration absorbing devices 54 extend in parallel to the floor plate 36 and the flat plates 52, in a state in which the module 38 is removed. Each of the vibration absorbing devices 54 includes an upper metal plate 60, an elastic member 48, and a lower metal plate 62.

The upper metal plates 60 are substantially disk-shaped metal plates (sheet metal) that sandwich the elastic members 48 between the upper metal plates 60 and the lower metal plates 62. In the upper metal plates 60, first fastening members 64 are fixed thereto on a side opposite to a surface thereof that faces the elastic members 48. The first fastening members 64, for example, are bolts having threaded body portions that extend upwardly. By inserting the first fastening members (bolts) 64 into the first notches 56, the vibration absorbing devices 54 are fixed to the mounting members 50. At this time, nuts may be used to suitably fix the vibration absorbing devices 54 to the mounting members 50. Such a configuration is preferable because, if the fastening between the upper metal plates 60 and the mounting members 50 is released, it becomes easy to adjust the relative positioning of the vibration absorbing devices 54 with respect to the mounting members 50 along the direction in which the first notches 56 extend.

According to the present embodiment, the elastic members 48 are made of rubber. Each of the elastic members 48 is adhered to a lower part of the upper metal plate 60 and to an upper part of the lower metal plate 62. According to the present embodiment, the control panel 18 is equipped with four of the vibration absorbing devices 54, and the elastic members 48 of the four vibration absorbing devices 54 have the same elastic modulus. It should be noted that the elastic members 48 are not limited to being made of rubber, insofar as they are elastic members. For example, the elastic members 48 may be springs.

The lower metal plates 62 are metal plates having a substantially rhombic shape that is wider than the upper metal plates 60 and the elastic members 48. As shown in FIG. 6A, holes 66 are provided respectively in both end sides in a widthwise direction of each of the lower metal plates 62. Second fastening members 68 are inserted into the holes 66. The second fastening members 68, for example, are bolts. The second fastening members (bolts) 68 are inserted into the second notches 58 through the holes 66. Consequently, the vibration absorbing devices 54 are fixed to the flat plates 52. Such a configuration is preferable because, if the fastening between the lower metal plates 62 and the flat plates 52 is released, it becomes easy to adjust the relative positioning of the vibration absorbing devices 54 with respect to the flat plates 52 along the direction in which the second notches 58 extend. Moreover, the shape of the lower metal plates 62 is not particularly limited, insofar as the holes 66 can be provided therein at both ends of the wide metal plates, and may be, for example, a rectangular shape.

The above-described vibration absorbing devices 54, due to the elasticity of the elastic members 48, absorb vibrations transmitted from the machine base 16 to the module 38. Further, concerning the vibration absorbing devices 54, each vibration absorbing device 54 is fixed to each of the left end portion 50L and the right end portion 50R of each one of the mounting members 50. Consequently, load of the module 38 and the mounting members 50 is suitably distributed to the four vibration absorbing devices 54.

Further, the two vibration absorbing devices 54 that support each one of the mounting members 50 are disposed symmetrically about the center of gravity line 70, which is defined by a straight line lying parallel to the longitudinal direction (front-rear direction) of the module 38, and which passes through the center of gravity G of the module 38 (see FIG. 3).

More specifically, virtual straight lines 72 connecting (the centers of) the two vibration absorbing devices 54 that support each one of the mounting members 50 are orthogonal to the center of gravity line 70. Further, concerning the two vibration absorbing devices 54, the distance between one of the vibration absorbing devices 54 and the center of gravity line 70, and the distance between the other one of the vibration absorbing devices 54 and the center of gravity line 70 are equivalent (FIG. 3: pg). Consequently, the amounts by which the plurality of vibration absorbing devices 54 are compressed are made uniform, and the module 38 is suitably prevented from becoming inclined with respect to the installation surface 36.

Moreover, the term "center of gravity G of the module 38" when stated more strictly is a "center of gravity G of the module 38 and the mounting members 50". Further, the term "distance" as discussed above indicates a "shortest distance".

In the foregoing manner, according to the present embodiment, the control panel 18 for the injection molding machine 10 is provided in which vibrations transmitted from the installation surface 36 to the module 38 are suitably reduced, and which suitably prevents the module 38 from becoming inclined with respect to the installation surface 36.

Further, according to the present embodiment, it becomes easy to adjust the relative positioning of the vibration absorbing devices 54 with respect to the mounting members 50 as well as the relative positioning thereof with respect to the flat plates 52. Accordingly, it becomes easy to dispose the two vibration absorbing devices 54 symmetrically while sandwiching (interposing) the center of gravity line 70 therebetween.

MODIFICATIONS

Although an embodiment has been described above as one example of the present invention, it goes without saying that various modifications or improvements are capable of being added to the above-described embodiment. It is clear from the scope of the claims that other modes to which such modifications or improvements have been added can be included within the technical scope of the present invention.

Modification 1

FIG. 7 is a diagram for the purpose of describing a first modification. It should be noted that the range shown in FIG. 7 corresponds to the range shown in FIG. 5. Further, in the present modification, the holes 66 provided in the lower metal plates 62 are referred to as first holes 66 for the sake of convenience.

The second notches 58 may be omitted. In this case, the flat plates 52 may have, formed therein, second holes 74 into which the second fastening members 68 are inserted. In the present modification, the second fastening members 68 (bolts) are inserted into the second holes 74 through the first holes 66 of the vibration absorbing devices 54. Consequently, the vibration absorbing devices 54 are fixed to the flat plates 52. The second holes 74 may also be in the form of grooves having a depth that does not penetrate through the flat plates 52.

The flat plates 52, in the same manner as in the embodiment, function as supporting members for the vibration absorbing devices 54. More specifically, instead of it being difficult to adjust the relative positioning of the vibration absorbing devices 54 with respect to the flat plates 52, it is possible to suitably prevent unintended deviations from occurring in relation to such relative positioning.

Threaded grooves for screw-engagement with the second fastening members (the bolts) 68 may be formed on inner surfaces of the second holes 74. By screw-engagement of the threaded grooves and the second fastening members 68, the vibration absorbing devices 54 are suitably fixed to the flat plates 52.

Modification 2

Figure 8:
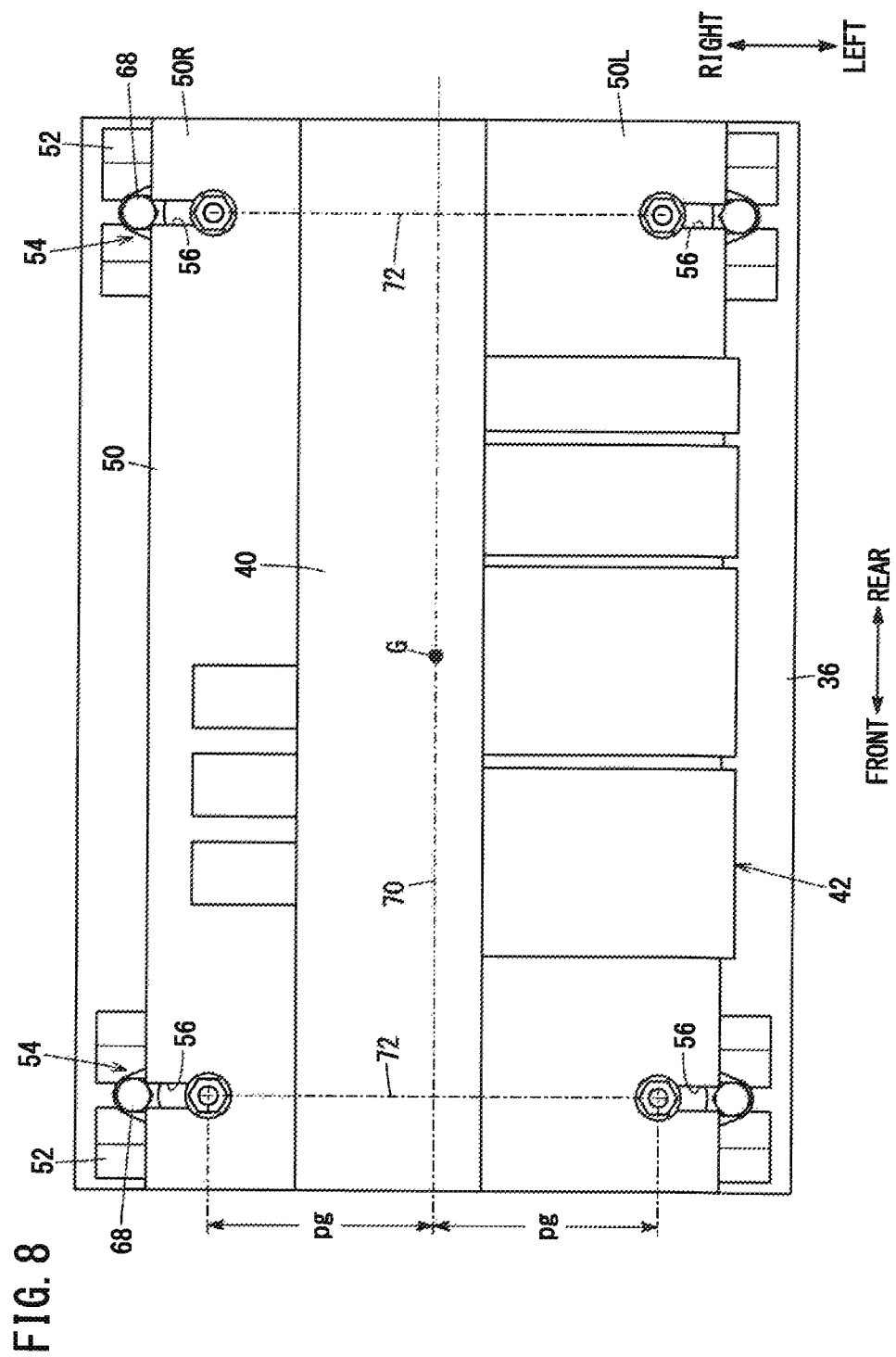
FIG. 8 is a top view of the control panel according to a second modification.

FIG. 8 is a top view of the control panel 18 according to a second modification.

According to the embodiment, the module 38 is supported by the plurality of mounting members 50. Without being limited to this feature, as shown in FIG. 8, the module 38 may be supported by a single mounting member 50.

Modification 3

The plurality of vibration absorbing devices 54 may be arranged at different distances from the center of gravity line 70. In this case, the moduli of elasticity of the respective plurality of vibration absorbing devices 54 are made to differ from each other depending on a distance thereof from the center of gravity G. In the same manner as in the embodiment, the term "distance" indicates a "shortest distance".

According to the present modification, different loads are considered to be applied to the plurality of vibration absorbing devices 54. In such a case, if the modulus of elasticity of the elastic members 48 provided in the plurality of vibration absorbing devices 54 is the same, the amounts by which the elastic members 48 are compressed differ from each other.

According to the present modification, the modulus of elasticity of each of the plurality of elastic members 48 is experimentally obtained in advance in a manner so that the amounts of compression of the elastic members are made uniform. Consequently, the module 38 is prevented from becoming inclined with respect to the installation surface 36.

Modification 4

According to the embodiment, although the floor plate 36 of the machine base 16 is used as the installation surface, the installation surface is not limited to such a floor plate 36. For example, a floor surface of a factory in which the injection molding machine 10 is installed can also serve as the installation surface. In this case, the vibration absorbing devices 54 may be disposed between the mounting members 50 and the floor surface of the factory. In this case as well, vibrations are transmitted to the module 38 via the machine base 16 and the floor surface of the factory. According to the present modification, such vibrations can be suitably reduced.

Modification 5

The above-described embodiments and the respective modifications thereof may be appropriately combined within a range in which no technical inconsistencies occur.

Inventions that can be Obtained from the Embodiment

The inventions that can be grasped from the above-described embodiment and the modifications thereof will be described below.

First Invention

The control panel (18) for the injection molding machine (10) includes the module (38) having the plurality of electronic components (42), the mounting members (50) that support the module (38) and have widths that are wider than that of the module (38) in the lateral direction of the module (38), and the plurality of vibration absorbing devices (54) that support the mounting members (50) between the mounting members (50) and the installation surface (36), and which elastically absorb vibrations transmitted from the installation surface (36) to the module (38), wherein the plurality of vibration absorbing devices (54) are disposed symmetrically about the center of gravity line (70) defined by the straight line lying parallel to the longitudinal direction of the module (38) and which passes through the center of gravity (G) of the module (38).

In accordance with such features, the control panel (18) for the injection molding machine (10) is provided in which vibrations transmitted from the installation surface (36) to the module (38) are suitably reduced, and which suitably prevents the module (38) from becoming inclined with respect to the installation surface (36).

The number of the mounting members (50) may be two, and the two mounting members (50) may support the module (38) respectively at both end sides of the module (38) in the longitudinal direction. In accordance with this feature, the load applied from the module (38) to the two mounting members (50) can be suitably distributed.

The number of the vibration absorbing devices (54) may be four, and each one of the two mounting members (50) may be supported by two of the four vibration absorbing devices (54) at both end portions (50L, 50R) of the corresponding mounting member (50) in the lateral direction. In accordance with this feature, the load applied to the two vibration absorbing devices (54) that support each one of the mounting members (50) is suitably distributed.

There may further be provided the adjustment members (52) that adjust the positions of the vibration absorbing devices (54) in the lateral direction. In accordance with this feature, it is easy to dispose the two vibration absorbing devices (54) symmetrically while sandwiching (interposing) the center of gravity line (70) therebetween.

Holes may be formed in the vibration absorbing devices (54), and the adjustment members (52) may be members having the elongated holes (58) into which the fastening members are inserted via the holes, and may be disposed between the installation surface (36) and the vibration absorbing devices (54). In accordance with this feature, the relative positioning of the vibration absorbing devices (54) with respect to the adjustment members (52) can be easily adjusted.

Second Invention

The control panel (18) for the injection molding machine (10) includes the module (38) having the plurality of electronic components (42), the mounting members (50) that support the module (38) and have widths that are wider than that of the module (38) in the lateral direction of the module (38), and the plurality of vibration absorbing devices (54) that support the mounting members (50) between the mounting members (50) and the installation surface (36), and which elastically absorb vibrations transmitted from the installation surface (36) to the module (38), wherein the plurality of vibration absorbing devices (54) are disposed so as to interpose therebetween the center of gravity line (70) defined by the straight line lying parallel to the longitudinal direction of the module (38) and which passes through the center of gravity (G) of the module (38), and the modulus of elasticity of each of the plurality of vibration absorbing devices (54) differs depending on a distance thereof from the center of gravity line (70).

In accordance with such features, the control panel (18) for the injection molding machine (10) is provided in which vibrations transmitted from the installation surface (36) to the module (38) are suitably reduced, and which suitably prevents the module (38) from becoming inclined with respect to the installation surface (36).

What is claimed is:

1. A control panel for an injection molding machine, the control panel comprising:
   a module including a plurality of electronic components;
   a mounting member configured to support the module, and having a width wider than that of the module in a lateral direction of the module;
   a plurality of vibration absorbing devices configured to support the mounting member between the mounting member and an installation surface, and to elastically absorb vibrations transmitted from the installation surface to the module; and
   an adjustment member disposed between the installation surface and the vibration absorbing devices,
   wherein
   the adjustment member is permanently fixed to a top surface of the installation surface,
   the vibration absorbing devices are fixed to a bottom surface of the mounting member,
   the adjustment member is provided with a plurality of grooves,
   a width of the grooves with respect to the lateral direction of the module is longer than a width of the grooves with respect to a longitudinal direction of the module,
   the grooves sandwich the module in the lateral direction,
   the plurality of vibration absorbing devices are attached, by a plurality of fastening members that is capable of being inserted to the grooves via the vibration absorbing devices, to the adjustment member symmetrically about a center of gravity line defined by a straight line lying parallel to the longitudinal direction and which passes through a center of gravity.

2. The control panel for the injection molding machine according to claim 1, wherein a number of the mounting members is two, and the two mounting members support the module respectively at both end sides of the module in the longitudinal direction.

3. The control panel for the injection molding machine according to claim 2, wherein a number of the vibration absorbing devices is four, and each one of the two mounting members is supported by two of the four vibration absorbing devices at both end portions of the corresponding mounting member in the lateral direction.

4. The control panel for the injection molding machine according to claim 1, wherein:
   holes through which the fastening members are capable of being inserted are formed in the vibration absorbing devices.

5. A control panel for an injection molding machine, the control panel comprising:
   a module including a plurality of electronic components;
   a mounting member configured to support the module, and having a width wider than that of the module in a lateral direction of the module;
   a plurality of vibration absorbing devices configured to support the mounting member between the mounting member and an installation surface, and to elastically absorb vibrations transmitted from the installation surface to the module; and
   an adjustment member disposed between the installation surface and the vibration absorbing devices,
   wherein
   the adjustment member is permanently fixed to a top surface of the installation surface,
   the vibration absorbing devices are fixed to a bottom surface of the mounting member,
   the adjustment member is provided with a plurality of grooves,
   a width of the grooves with respect to the lateral direction of the module is longer than a width of the grooves with respect to a longitudinal direction of the module,
   the grooves sandwich the module in the lateral direction,
   the plurality of vibration absorbing devices are attached, by a plurality of fastening members that is capable of being inserted to the grooves via the vibration absorbing devices, to the adjustment member symmetrically about a center of gravity line defined by a straight line lying parallel to the longitudinal direction and which passes through a center of gravity of the module, and a modulus of elasticity of each of the plurality of vibration absorbing devices differs depending on a distance thereof from the center of gravity line.

6. The control panel for the injection molding machine according to claim 1, wherein the adjustment member includes a groove, in a plan view, the groove extending from one of the vibration absorbing devices to an outer edge of the adjustment member.

7. The control panel for the injection molding machine according to claim 5, wherein the adjustment member includes a groove, in a plan view, the groove extending from one of the vibration absorbing devices to an outer edge of the adjustment member.

8. The control panel for the injection molding machine according to claim 1, wherein the adjustment member is plate-shaped.

9. The control panel for the injection molding machine according to claim 1, wherein the adjustment member contacts the top surface of the installation surface.

* * * * *